UNITED STATES PATENT OFFICE.

AMBROSE G. FELL, OF NEW YORK, N. Y.

PROCESS OF MAKING A LEAD PIGMENT.

SPECIFICATION forming part of Letters Patent No. 396,275, dated January 15, 1889.

Application filed March 1, 1887. Renewed June 14, 1888. Serial No. 277,056. (Specimens.)

*To all whom it may concern:*

Be it known that I, AMBROSE G. FELL, a citizen of the United States, and a resident of the city, county, and State of New York, have invented a new Lead Pigment and Process of Preparing Same, of which the following is a specification.

My invention relates to a novel lead pigment and to a method of preparing same from metallic lead; and the object of my invention is to produce a white-lead pigment, which, while possessing as good color and body as that produced by the old Dutch method, shall also possess the desirable qualities of durability and resistance to decomposition in a greater degree than the lead carbonate produced by that and other methods.

The white lead of commerce, which is a carbonate more or less impure, is white in color and its molecular structure is very fine. It is this latter quality which recommends it most especially to painters, for the reason that the fineness of its particles or molecules enables it to "cover" well and to spread evenly under the brush; but the carbonate does not always possess this desirable quality, and especially that produced by precipitation from lead solutions. The lead compounds vary in color from black to white and vary in structure from a coarse crystal to an exceedingly fine amorphous particle, and the carbonate, while always white, differs greatly in structure, according to the manner in which it is produced. That produced by corrosion is superior in this respect, and that produced by precipitation is inferior; but the latter is the cheaper method of manufacture. The uncertainty attending the production of lead carbonate by corrosion and the practical impossibility of properly governing or controlling the process of manufacture so as to give economical and uniform results has led to various attempts to produce a satisfactory white-lead pigment by other more controllable and economical means. My present invention, I believe, accomplishes this desirable result. There are two well-known compounds of sulphur and lead—namely, the sulphide (PbS) and the sulphate, ($PbSO_4$.) The former is black and extremely fine in structure when produced by precipitation, and the latter is white, but crystalline in texture. Therefore the former as a pigment possesses good "body" and the latter possesses good color, but neither possess both of these qualities combined.

My new pigment is a compound of sulphur and lead, which in its chemical relations stands between the sulphide and sulphate, containing more oxygen than the sulphide and less oxygen than the sulphate. It resembles the sulphide in texture and the sulphate in color; and it is these characteristics which recommend it as a pigment for use as a substitute for the carbonate.

The new pigment is substantially or practically amorphous in structure; its molecules are very fine; it possesses "covering" qualities equal to the best carbonate, and is very white, inclining to blue, and when tested in the usual way of examining samples of dry white lead is readily distinguished from all other white lead by yielding a "blue streak" when a small portion of the dry pigment is streaked on a dark surface by means of the thumb-nail in the usual manner as known to the trade. Other white leads yield a yellowish or grayish streak, according to quality. This feature not only renders my white lead easily distinguishable at sight, but at the same time indicates a quality which recommends it to the dealer and consumer. It is much less soluble than the carbonate and resists better the decomposing effects of sulphureted hydrogen. Therefore it is more durable than the carbonate when exposed to the action of the elements.

The process I employ in producing my pigment may be briefly outlined as follows: The metallic lead is either reduced to small bits or particles, or it may be reduced to an oxide by any known process. It is next submitted to the action of a solvent, acetic acid answering as well as any. It is not necessary that a perfect solution of the metal shall be effected, as a more or less soluble paste will answer the purpose—such, for instance, as the chloride of lead, produced by grinding together oxide of lead and common salt, (sodium chloride;) or protoxide of lead may be acted on by acetic or other acid and brought to a more or less pasty condition. A small percentage of acid only should be used. The lead contained in the solution or mixture is converted first into sulphite ($PbSO_3$) by the action thereon of sulphurous oxide ($SO_2$) or a compound of the same, and the resultant sulphite is next converted into a subsulphite by the action of steam, and the pigment, after being freed from foreign matters, is dried and ground in oil for use.

In practice I proceed as follows in carrying out my invention. The metallic lead is granulated or made spongy by melting and pouring it into water. Then this granulated metal is placed in a series of suitable vessels, (wooden tanks will serve,) three being sufficient, and the first vessel is filled with water containing ten or more per cent. of commercial acetic acid. This mixture would contain about two and one-half per cent. of the anhydrous acid. The lead is permitted to digest in this dilute acid for about thirty minutes, when the liquid is drawn off into the second vessel. After remaining in this vessel for about the same length of time, it is drawn off into the third vessel and allowed to remain in that for about the same period. In the meantime the lead in the first two vessels has been undergoing oxidation from contact with the air, such oxidation being accompanied by the usual rise in temperature. The liquid is now transferred to the first vessel again, and it is thus transferred from vessel to vessel, dissolving a portion of the lead oxide at each period of digestion and increasing in density. This process is continued until the solution marks from 15° to 20° Baumé. This is a solution of basic acetate of lead. It may be observed in passing that where a battery of three vessels is employed in this way and the period of digestion is thirty minutes the period of oxidation of the metal will be sixty minutes. The solution of basic acetate is now drawn off into a deep tank and sulphurous-acid gas forced through it. This, owing to the greater affinity of the sulphurous acid for the lead, decomposes the acetate and converts the lead into white sulphite. The acetic acid is liberated, taking the form of a solution of acetic acid and basic acetate. The sulphite, held mainly in suspension in the liquid, is separated, preferably, by means of a filter-press, then washed, either in the press or after removal therefrom, and then well agitated with steam, which first drives off the remaining traces of the free acids, and, secondly, as I believe, drives off a portion of the sulphurous acid chemically combined with the lead, reducing the sulphite to a sub-salt, and thus improving the color and body of the pigment. The pigment is then dried, (the steaming facilitating the drying by heating the pigment,) ground in oil or other liquid vehicle, but preferably linseed-oil, and packed for market.

If a lead compound capable of being acted upon by sulphurous acid is used in a pasty condition, the use of shallow troughs would be preferable to a deep tank when it is subjected to the action of the sulphurous acid.

I prefer to produce the sulphurous-acid gas used in my process by burning sulphur in compressed air, the tension of the air being utilized to force the resultant sulphurous-acid gas into and through the lead solution; but I do not limit myself to the production of the gas in this manner. It might be obtained, for instance, by roasting ores containing sulphur.

I do not claim the treatment of metallic lead or its oxide, as above described, for obtaining a solution or soluble paste of lead in itself, but only as a step in my process; nor do I limit myself to the employment of any particular salt or compound of lead. It is only necessary that the compound used shall be of such a nature that the sulphurous oxide ($SO_2$) or its compounds will decompose it and combine with the lead it contains. I prefer the solution of basic acetate as described, for the reason, mainly, that there is no appreciable loss of acid, as the dilute acid from the filter-press is returned to the digesting-vessels for use over and over again.

The advantages of my product as a white-lead pigment over the ordinary carbonate have been hereinbefore enumerated, and the advantages of my process over that employed in producing the best carbonate—that is, by corrosion—are economy and uniformity.

The theoretical increase in the weight of the product over the weight of metal consumed is about twenty-five per cent. by the corrosion process, while by my process it is about thirty-eight per cent., and, owing to the facility with which my process may be controlled, as contrasted with the corrosion process, I am enabled to produce a pigment of uniformly good quality and to approach much more nearly to the above-stated theoretical increase in weight than is reached in the preparation of carbonate by the corrosion process.

In treating the pasty or semi-fluid mass with steam after it comes from the filter I usually proceed as follows: The mass is put in a tank or vessel and live steam admitted in such a manner as to pass through it and heat it. The steam may be relied on to agitate the mass, or it may be agitated mechanically, the object being to mechanically and chemically act upon the sulphite, as before described, which action removes a portion of the sulphurous acid chemically combined with the lead, as I believe, and which appears to be the case, since the sulphite so treated does not so readily change to sulphate as does the sulphite in its normal condition, and it is well known that all the sulphites are decomposed by heat. Moreover, the physical condition of the pigment is materially affected by the action of the steam. The particles become more opaque and compact, which to the painter constitutes additional body, while the color is also much improved, as indicated by its general appearance, and by means of the blue streak trade test, before mentioned. Moreover, if a sample of the ordinary sulphite be mixed with oil and dried, after exposure to the elements for a sufficient length of time it assumes a greenish-yellowish hue, which is probably due to the combination of a portion of the sulphur of the sulphurous acid with the hydrogen in the moist air, producing first sulphureted hydrogen, and then lead sulphite. This objectionable action is not observed when the sulphite has been steamed, as indicated. It is apparent that any other means which in its action is chemically equivalent to the steam may be substituted therefor. For instance, it would be possible to act upon the normal sulphite with an alkaline reagent, which would not only neutralize any excess of free sulphurous acid that might be present, but would also combine with a portion of that combined with the metal, thus practically bringing about the same result, although in such a mode of treatment a foreign residual substance would be introduced into the resulting pigment, which would be objectionable; also, it would be difficult to control the chemical action of an alkaline reagent, and the decomposition might proceed too far and result in injury to the product; but in any event, whether the steam or its equivalent be employed, so long as the desired result is attained, the means used is immaterial. I prefer the steam as being both effectual, controllable, and convenient.

It is believed that the new pigment may be properly termed an "amorphous subsulphite of lead." By the term "amorphous," herein employed as descriptive of my pigment, I mean practically or substantially amorphous, and not absolutely so. While it appears to be absolutely amorphous, and is sufficiently so to form a satisfactory covering body, future advances in science may show that it contains crystals.

While I believe my new pigment to be a basic sulphite, further investigation may prove it to be an allotropic form of sulphite of lead.

Having thus described my invention, I claim—

1. The herein-described method of producing the new pigment herein described, which consists in forming a solution of a salt of lead, forcing sulphurous acid through the said solution, whereby the lead is converted into normal sulphite, separating said sulphite from the liquid, steaming it, and drying it.

2. The herein-described process of treating sulphite of lead for the production of a lead pigment, which process consists in subjecting the sulphite to the action of steam or its equivalent, for the purpose and in the manner described.

3. The method of producing the new pigment herein described, which consists in forming a solution of acetate of lead, forcing sulphurous acid through the said solution, whereby the lead is converted into normal sulphite, separating said sulphite from the liquid, steaming it, and drying it, substantially as set forth.

4. As a new manufacture, a lead pigment consisting, substantially, of a lead sulphite white in color and distinguished by yielding a blue streak and by the other properties and characteristics herein set forth.

In testimony whereof I have signed this specification in the presence of two subscribing witnesses.

AMBROSE G. FELL.

Witnesses:
MARTEL DREW,
JOHN McCLURE.

Correction in Letters Patent No. 396,275.

It is hereby certified that in Letters Patent No. 396,275, granted January 15, 1889, upon the application of Ambrose G. Fell, of New York, N. Y., for an improved "Process of Making a Lead Pigment," an error appears in the printed specification requiring correction as follows: In line 7, page 3, the word "sulphite" should read *sulphide*, and that the said Letters Patent should be read with this correction therein to make the same conform to the record of the case in the Patent Office.

Signed, countersigned, and sealed this 19th day of February, A. D. 1889.

[SEAL.]
                                            D. L. HAWKINS,
*Assistant Secretary of the Interior.*

Countersigned:
    BENTON J. HALL,
        *Commissioner of Patents.*